B. L. STONE.
Burglar Alarm.
No. 46,402.
2 Sheets—Sheet 1.
Patented Feb 14, 1865.
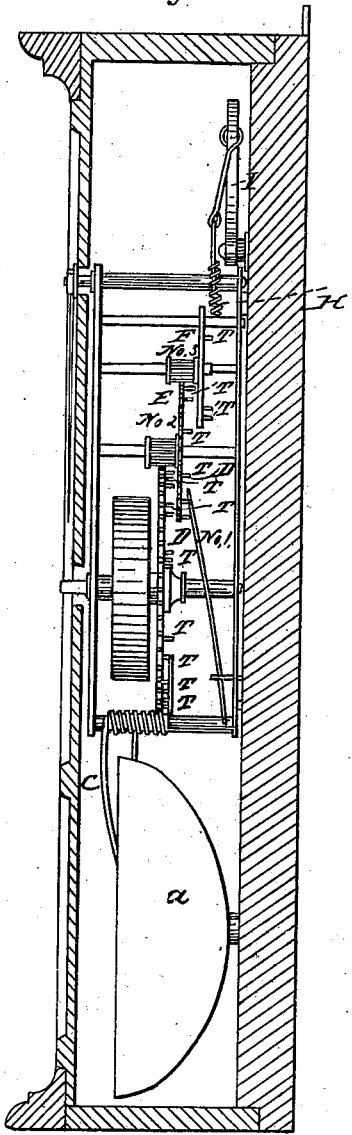
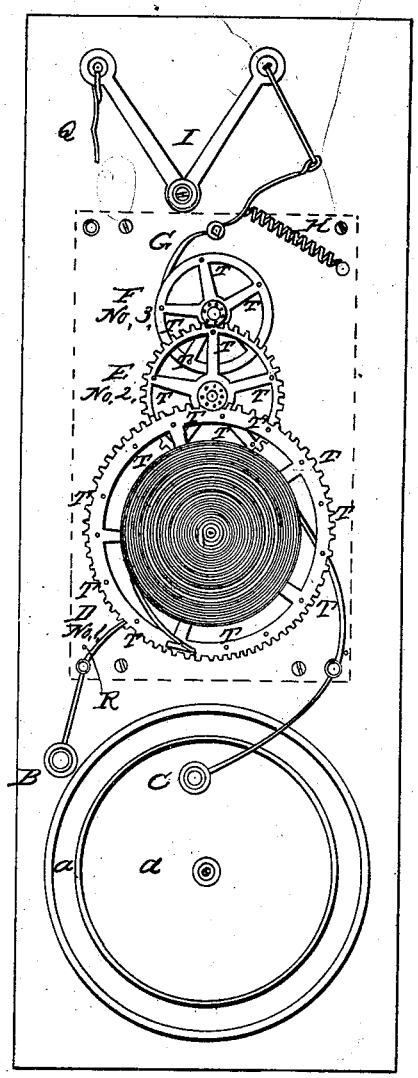

B. L. STONE.
Burglar Alarm.
No. 46,402.
2 Sheets—Sheet 2.
Patented Feb 14, 1865.
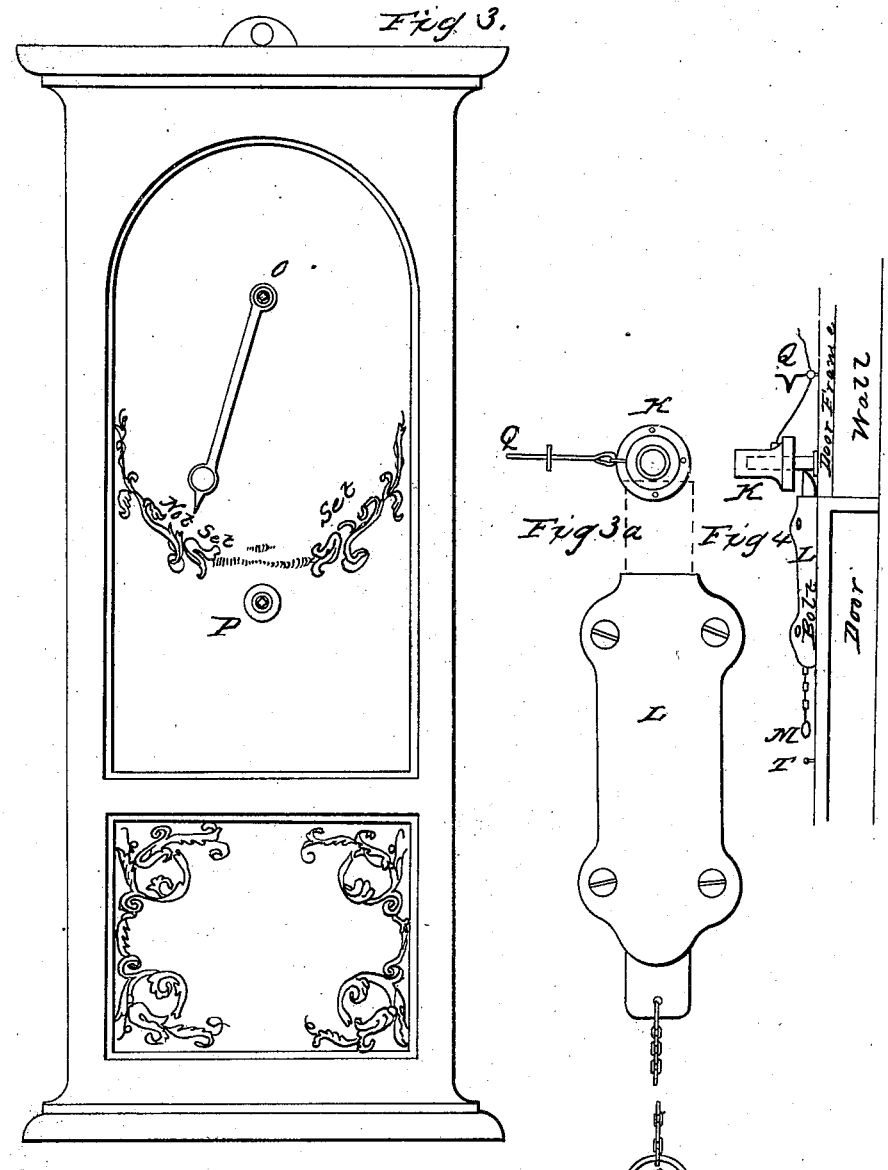

UNITED STATES PATENT OFFICE.

BERNHARD L. STONE, OF SAN FRANCISCO, CALIFORNIA.

IMPROVEMENT IN BURGLAR-ALARMS.

Specification forming part of Letters Patent No. 46,402, dated February 14, 1865.

*To all whom it may concern:*

Be it known that I, BERNHARD L. STONE, of the city and county of San Francisco, State of California, have invented a new and useful Improvement on the Machine known as a "Burglar-Alarm Clock," which is known as "Stone's Improved Burglar-Alarm;" and I do hereby declare that the following is a full, clear, and exact description of the construction and operation of the same, with my improvements, reference being had to the annexed drawings, making a part of this specification, in which—

Figure 1 is a side view of the works. Fig. 2 is a front view of the works. Fig. 3 is a front view of the case. F 3ª is a front view of the spring-bolt, cap and ring. Fig. 4 is a side view of the cap and spring-bolt.

The following is the description and operation of the machine.

A A are two alarm-bells; B and C, bell-hammers.

D, No. 1, is a wheel with mainspring attached, on which wheel pins T project, on which the wire R of bell-hammer B rests.

E, No. 2, is a wheel, the pinions of which run on cogs or teeth of wheel D, No. 1, in which are projecting pins T, as in D, No. 1, upon which the wire of bell-hammer C rests.

F, No. 3, is a plain wheel, the pinions of which runs on the teeth or cogs of wheel E, No. 2, in which wheel are four or more pins, T, projecting.

G is a pivot-lever, upon which the pins T in wheel F, No. 3, rest when the alarm is set.

H is a spring attached to wire of lever G, and one end of which is fastened to the back plate of the alarm.

I is a triangle, attached by a screw or pin to the top of the alarm plate, from one end of which a wire attaches it to lever-wire G. On the other end of the triangle is attached a wire or cord, Q, the other end of which wire or cord Q is fastened to a loose cap, K, which is a hollow metal cap set upon a pin, as shown in Fig. 4, which pin is fastened to the door-frame about a quarter of an inch above the door.

L is a common spring door-bolt, fastened to the top of the door with chain and ring M attached, (as also shown in Fig. 4,) and which ring M, when the alarm is not set, is passed over a pin, T, driven into the door below the bolt for that purpose, and which keeps down the upper part of the bolt.

When the alarm is set, the ring M is taken off the pin T, and the upper part of the bolt slides up and passes behind the cap K and sets close to the pin on which the cap K is placed. To this cap K a wire or cord, Q, is fastened, which wire or cord Q communicates with and is an extension of the wire or cord Q, which is fastened to the left end of the triangle I, as shown in Fig. 2. The slightest attempt to open the door when the alarm is set forces the upper part of the bolt against the inside of the cap K and throws it off the pin, and the cap K is immediately drawn back as far as a small screw-ring, V, (through which the wire or cord Q runs, which screw-ring is screwed into the door-frame about two inches from the pin on which the cap K is placed,) by the force of the spring H, attached to the wire of lever G, which lifts the lever-wire G from the pin T of wheel F, No. 3, and sets the alarm in motion. The alarm can be situated in any part of the house, provided the wire or cord Q attached to the left end of the triangle I in Fig. 2 is extended to and connected with the wire or cord Q which is fastened to the cap K over the door, as in Fig. 4. The alarm will continue ringing for five minutes.

O is the indicating-hand, attached to the pivot upon which the pivot-lever G works, and indicates when the alarm is set or not set.

P is the pivot upon which a key is placed to wind up the spring of the alarm.

I do not assert any claim to the original invention of a burglar-alarm clock.

What I claim as my invention and improvement in the burglar-alarm, and for which I ask Letters Patent, is—

The arrangement of the hammers B and C, the invention of lever G and spring H, as arranged, together with the arrangement of the triangle I, as attached to lever-wire G and extending from one end of the triangle I, and a wire or cord, Q, which is fastened to the other end of the triangle I and extends to cap K, which also I claim as my invention, together with the arrangement and operation of the spring door-bolt L, which, by throwing off the cap K, sets the alarm in operation. The alarm continues until the machine runs down.

Witnesses:                B. L. STONE.
   JAMES M. RAPHALT,
   P. B. CORNWALL.